United States Patent [19]

Ichikawa

[11] 4,325,094
[45] Apr. 13, 1982

[54] TAPE RECORDER HAVING INTERLOCKED TAPE SPEED AND TONE CONTROL ADJUSTMENT

[75] Inventor: Hiroki Ichikawa, Hachioji, Japan

[73] Assignee: Olympus Optical Co., Ltd., Tokyo, Japan

[21] Appl. No.: 122,435

[22] Filed: Feb. 19, 1980

[30] Foreign Application Priority Data

Feb. 26, 1980 [JP] Japan .................................. 55-21537

[51] Int. Cl.³ .......................... G11B 5/00; G11B 19/00
[52] U.S. Cl. ......................................... 360/137; 360/8; 369/25
[58] Field of Search ........................ 360/8, 9, 137, 73; 179/100.1 S, 100.1 TC; 274/9 A, 11 D; 369/25

[56] References Cited

U.S. PATENT DOCUMENTS

| | | | |
|---|---|---|---|
| 2,996,583 | 8/1961 | Springer | 360/8 |
| 3,047,673 | 7/1962 | Springer | 360/8 |
| 3,409,743 | 11/1968 | Greefkes | 179/100.1 TC X |
| 3,869,708 | 3/1975 | Schiffman | 360/8 |
| 3,873,778 | 3/1975 | Mutsuura | 360/8 X |

*Primary Examiner*—Aristotelis M. Psitos
*Attorney, Agent, or Firm*—Frishauf, Holtz, Goodman & Woodward

[57] ABSTRACT

A tape recorder comprises a rotary type tape speed control means which has a control shaft to increase the running speed of a magnetic tape when it is rotated in one direction and to decrease the same when it is rotated in the other direction, a rotary type tone adjusting means which has an adjusting shaft to lower a high frequency response of sound reproduced from the tape when it is rotated in one direction and to elevate the same when it is rotated in the other direction and a control mechanism mechanically coupled to the speed control means and the tone adjusting means. The control mechanism comprises a spur gear secured to the control shaft and a spur gear secured to the adjusting shaft and a spur gear engaged with the both spur gears to cause the adjusting shaft to rotate in one direction when the control shaft is rotated in one direction and to rotate in the other direction when the control shaft is rotated in the other direction.

8 Claims, 7 Drawing Figures

TAPE RECORDER HAVING INTERLOCKED TAPE SPEED AND TONE CONTROL ADJUSTMENT

BACKGROUND OF THE INVENTION

This invention relates to a tape recorder comprising a tape speed control means for changing the running speed of a magnetic tape during recording and reproducing operations and a tone adjusting means for adjusting the high frequency response of sound reproduced from the magnetic tape.

To write down or type a speech being reproduced from a magnetic tape, the tape is often made to run faster or more slowly than it ran to record the speech. When the tape runs faster than during the recording operation, the speech is reproduced in a higher tone. When the tape runs more slowly than during the recording operation, the speech is reproduced in a lower tone. For a typist it is difficult to hear the speech clearly if the speech is reproduced too fast or too slowly or if it is reproduced in an excessively low or high tone.

A tape recorder is known, which is provided with a tape speed control device for changing the tape running speed and a tone adjusting device for adjusting the tone of reproduced sound. To hear a speech being reproduced, both clearly and correctly, a typist operates the tape speed control device to run the tape at a desired speed and then operates the tone adjusting device to reproduce the speech in a desired tone. However, it is rather cumbersome for the typist to operate both devices separately.

To avoid such a cumbersome operation, use may be made of a variable speech control device. This device electrically works in interlock with a tape speed control device and which automatically changes the tone of a speech reproduced by running a magnetic tape at a speed higher or lower than the tape running speed during the recording operation to obtain such a tone as is the most desirable to the typist for hearing the speech clearly and correctly, in accordance with the difference between the tape running speed during the recording operation and the tape running speed during the reproducing operation. The variable speech control device, however, has a complicated structure and is very expensive.

SUMMARY OF THE INVENTION

An object of this invention is to provide a tape recorder with a control mechanism which has a simple structure and is inexpensive, and which can control the tape running speed and can automatically adjust the tone of sound reproduced when the tape runs at any selected speed for hearing sound clearly and correctly.

DESCRIPTION OF THE PREFERRED EMBODIMENT

Figure 1:
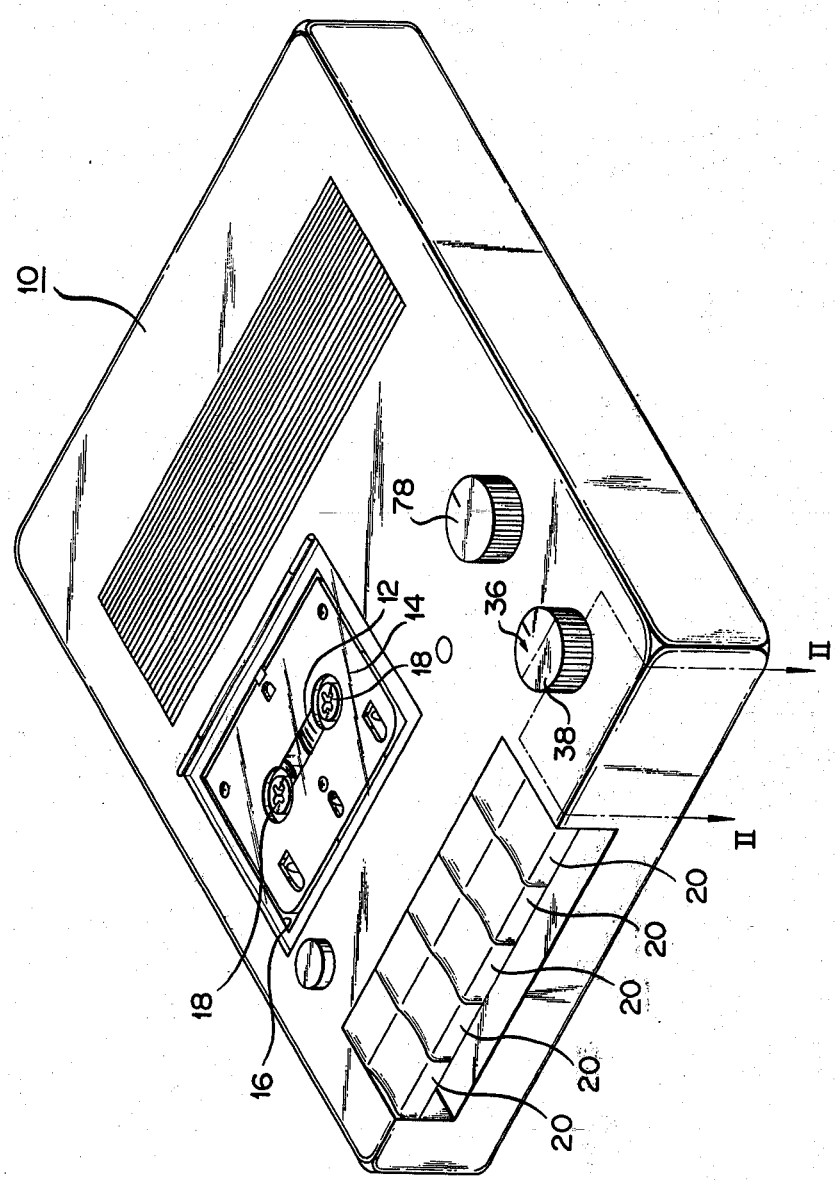
FIG. 1 is a perspective view of a tape recorder according to this invention.

The tape recorder 10 of FIG. 1 is so designed as to be used in writing down or typing what is recorded on a magnetic tape. It has a recess 16 for receiving a tape cassette 14 containing a magnetic tape 12. In the recess 16 a pair of reel shafts 18 protrude to engage the reel hubs of the cassette 14. Arranged also in the recess 16 are a capstan, a pinch roller and magnetic head (all not shown). The recess 16 is usually covered with a transparent cover. The tape recorder 10 is further provided with a variety of switches 20 for operating and controlling the reel shafts 18, the capstan, the pinch roller and the magnetic head.

Figure 2:
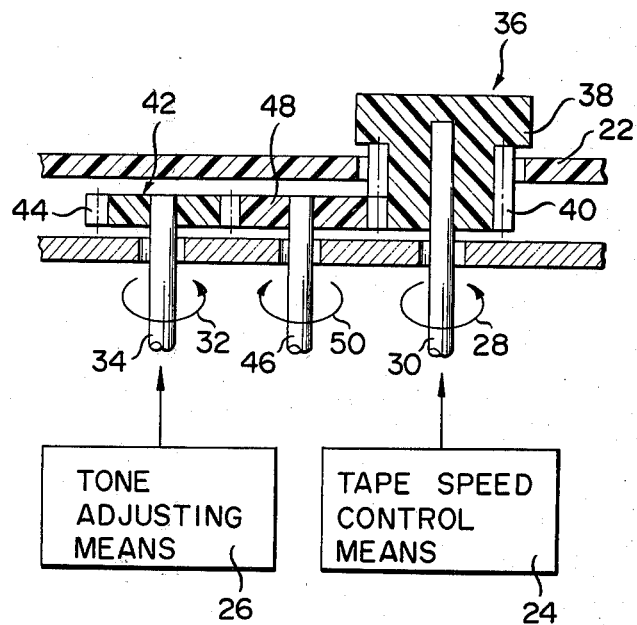
FIG. 2 is a schematic cross sectional view of a first embodiment of this invention, taken along line II—II in FIG. 1.

As shown in FIG. 2, in its housing 22 the tape recorder 10 has a tape speed control means 24 for changing the running speed of the magnetic tape during a recording or reproducing operation and a tone adjusting means 26 for adjusting the high frequency response of sound reproduced from the magnetic tape.

The tape speed control means 24 is of rotary type which has a control shaft 30. When the control shaft 30 is rotated in the direction of arrow 28, the tape running speed is increased. When the shaft 30 is rotated in the reverse direction, the tape running speed is reduced. The tone adjusting means 26 is of rotary type which has an adjusting shaft 34. When the adjusting shaft 34 is rotated in the direction of arrow 32, the high frequency response of sound reproduced from the magnetic tape 12 is lowered. When the shaft 34 is rotated in the reverse direction, the high frequency response of the reproduced sound is elevated. As illustrated in FIG. 2, the control shaft 30 and the adjusting shaft 34 are arranged close to each other and parallel to each other.

As shown also in FIG. 2, the control shaft 30 extends upward out of the housing 22, through an opening made in the top wall of the housing 22. A first rotary member 36 is coaxially secured to the upper end portion of the control shaft 30. The control shaft 30 is therefore rotated when the first rotary member 36 is turned. The first rotary member 36 is constituted by a knob 38 and a spur gear 40 which are coaxially put together. The knob 38 is located outside the housing 22, and the spur gear 40 is located within the housing 22.

Like the control shaft 30, the adjusting shaft 34 extends vertically. But its upper end does not pass through the top wall of the housing 22 and is located under the lower surface of the top wall. A second rotary member 42 is secured to the upper end portion of the adjusting shaft 34. The shaft 34 is therefore rotated when the second rotary member 42 is turned. The second rotary member 42 comprises a spur gear 44 which is placed in the same plane as is the spur gear 40 of the first rotary member 36 and which is coaxial with the adjusting shaft 34.

As illustrated in FIG. 2, another shaft 46 is provided between the control shaft 30 and the adjusting shaft 34. The shaft 46 extends parallel to both shafts 30 and 34 and is rotatably supported by a chassis (not shown) of the tape recorder 10. The upper end of the shaft 46 does not pass through the top wall of the housing 22 and is located under the lower surface of the top wall. Secured coaxially to the upper end portion of the shaft 46 is a drive member 48 which is a spur gear and which is put in engagement with both the spur gear 40 of the first rotary member 36 and the spur gear 44 of the second rotary member 42.

In the embodiment shown in FIG. 2, the first rotary member 36, the second rotary member 42 and the drive member 48 constitute a control mechanism which simultaneously changes the tape running speed and adjusts the tone of sound reproduced. The knob 38 of the first rotary member 36 is turned in the direction of arrow 28, thus causing the tape speed control means 24 to increase the tape running speed. At the same time, the drive member 48, which is put in engagement with the spur gear 40 of the first rotary member 36, rotates in the direction of arrow 50 and makes the second rotary member 42 rotate in the direction of arrow 32. Thus, the tone adjusting means 26 lowers the high frequency response of the sound which is being reproduced as the tape 12 runs at the increased speed. When the knob 38 is turned in the reverse direction, thus causing the tape speed control means 24 to decrease the tape running speed, the drive member 48 rotates in the reverse direction to make the second rotary member 42 rotate in the reverse direction. As a result, the tone adjusting means 26 elevates the high frequency response of the sound which is being reproduced as the tape 12 runs at the decreased speed.

According to this invention, the gear 40 of the first rotary member 36, the gear 44 of the second rotary member 42 and the drive member 48 are not limited to spur gears. They may be helical gears or herring bone gears. Moreover, the first rotary member 36, the second rotary member 42 and the drive member 48 may comprise friction wheels which are put in frictional engagement with one another.

Comprised of gears, among other things, the control mechanism can provide a firm mechanical connection between the tape speed control means 24 and the tone adjusting means 26. The tone adjusting means 26 can therefore elevate or lower the high frequency response of reproduced sound, both unfailingly and accurately according to a minute change of the tape running speed achieved by the tape speed control means 24.

In the embodiment of FIGS. 1 and 2 the drive member 48 transmits the rotation of the first rotary member 36 to the second rotary member 42, so that the first rotary member 36 and the second rotary member 42 rotates at the same time. According to the invention, the drive member 48 may be omitted and the gears 40 and 44 may be put in engagement so that the first rotary member 36 and the second rotary member 42 can simultaneously rotate. In this case, the adjusting shaft 34 should rotate in the direction of arrow 32 to cause the tone adjusting means 26 to elevate the high frequency response and should rotate in the reverse direction to cause the means 26 to lower the high frequency response. If the drive member 48 is omitted, the gear 40 of the first rotary member 36 and the gear 44 of the second rotary member constitute a drive member, and the drive member, the first rotary member 36 and the second rotary member 42 constitute a control mechanism for operating the tape speed control means 24 and the tone adjusting means 26 in interlock fashion.

Now a second embodiment of this invention will be described with reference to FIG. 3, wherein the same numerals are used to denote like or the same members as shown in FIG. 2. The embodiment of FIG. 3 uses a first rotary member 36 which is constituted by a knob 38 and a pulley 52 which are coaxial with each other. The knob 38 is located outside a tape recorder housing 22, and the pulley 52 is located within the housing 22. The first rotary member 36 is secured to the upper end portion of a control shaft 30 coaxially therewith. There is further provided a second rotary member 42 which is secured to the upper end portion of an adjusting shaft 34. The second rotary member 42 is a pulley 54 placed in the same plane as is the pulley 52 of the first rotary member 36. The pulleys 52 and 54 can be rotated at the same time by means of a drive member, or a driving belt 56 in this embodiment. The first rotary member 36, the second rotary member 42 and the driving belt 56 constitute a control mechanism for changing the tape running speed and adjusting the tone of sound reproduced from the tape, at the same time.

When the knob 38 of the first rotary member 36 is turned in the direction of arrow 28, thus causing the tape speed control means 24 to increase the tape running speed, the second rotary member 42 rotates in the direction of arrow 32, thereby causing the tone adjusting means 26 to lower the high frequency response of sound reproduced. When the knob 38 is turned in the reverse direction, thus causing the tape speed control means 24 to reduce the tape running speed, the second rotary member 42 rotates in the reverse direction, thus causing the tone adjusting means 26 to elevate the high frequency response of sound reproduced.

The control mechanism for changing both the tape running speed and the tone of sound reproduced does not includes gears which are accurately machined and which are therefore far more expensive than pulleys and a driving belt. Further such a drive member 48 as used in the embodiment of FIG. 2 is unnecessary. The control mechanism of FIG. 3 can therefore be manufactured at a lower cost than the control mechanism shown in FIG. 2. Moreover, it can be more easily assembled than the control mechanism of FIG. 2, which includes gears. It is usually time-consuming to put gears in a desired engagement. Further, it has an advantage where the distance between the control shaft 30 and the adjusting shaft 34 is long comparatively.

Figure 4:
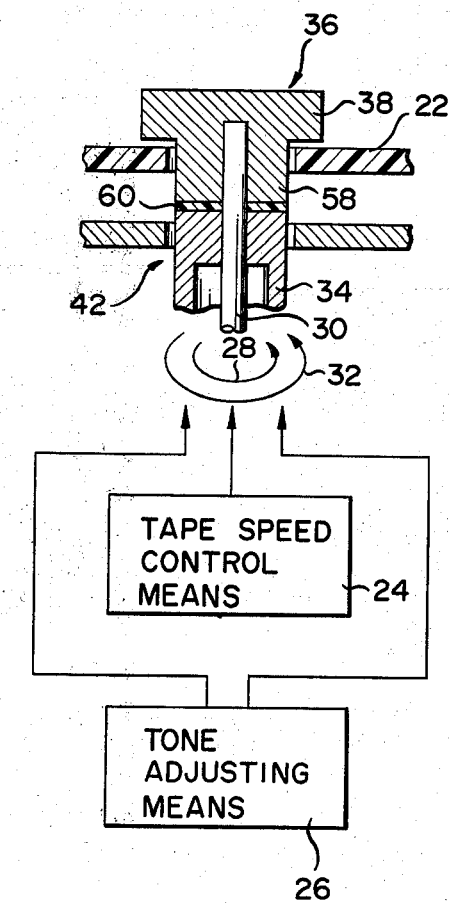
FIG. 4 is a schematic cross sectional view of a third embodiment of this invention.

Now referring to FIG. 4, a third embodiment of this invention will be described. In FIG. 4, the same numerals are used to denote like or the same members as illustrated in FIG. 2.

As shown in FIG. 4, the third embodiment comprises a control shaft 30, an adjusting shaft 34 and a first rotary member 36 secured to the upper end portion of the control shaft 30. It consists of a knob 38 and a disc member 58 which are integrally formed and which are coaxial with each other. The adjusting shaft 34 is formed by a hollow cylinder, the top of which is coaxially provided with a second rotary member 42 and both of them are an integral structure. The upper surface of the second rotary member 42 is located under the bottom of the disc member 58 and both of them are coaxially and strongly bonded to each other with a drive member, or an adhesive 60 in this embodiment. The first rotary member 36, the second rotary member 42 and the adhesive 60 constitute a control mechanism for changing the tape running speed and adjusting the tone of sound reproduced, at the same time.

When the knob 38 of the first rotary member 36 is turned in the direction of arrow 28, thus causing the tape speed control means 24 to increase the tape running speed, the second rotary member 42 rotates in the direction of arrow 32, thereby causing the tone adjusting means 26 to lower the high frequency response of sound reproduced. On the other hand, when the knob 38 is turned in the reverse direction, thus causing the tape speed control means 24 to reduce the tape running speed, the second rotary member 42 rotates in the reverse direction, thereby causing the tone adjusting means 26 to elevate the high frequency response of sound reproduced.

Figure 3:
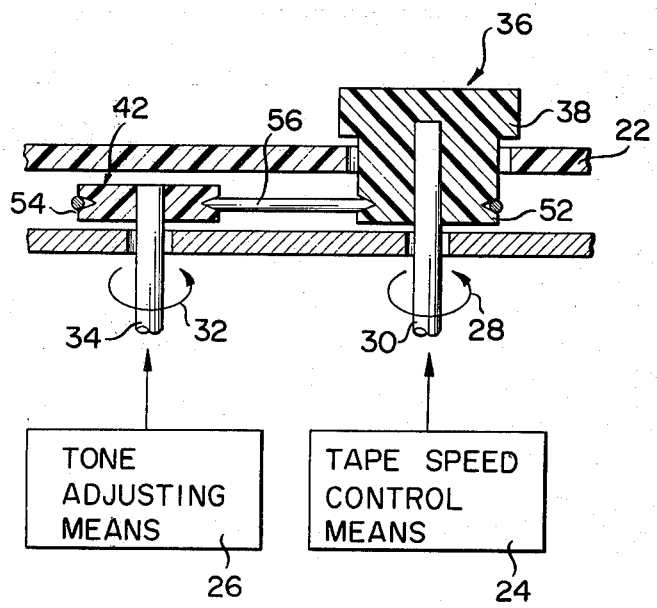
FIG. 3 is a schematic cross sectional view of a second embodiment of this invention.

Comprised of the first rotary member 36 and the second rotary member 42 which are aligned coaxial with the vertical control shaft 30, the control mechanism is less broad than the control mechanisms shown in FIG. 2 and FIG. 3. The control mechanism occupies less space than do those of FIGS. 2 and 3. Thus it helps miniaturize the tape recorder. This is desirable since it is more and more strongly demanded that tape recorders be made smaller.

In the embodiment of FIG. 4, the adhesive 60 is used to put together the disc member 58 of the first rotary member 36 and the second rotary member 42. The first rotary member 36 and the second rotary member 42 may be connected in other methods. For example, a claw may be provided on the bottom of the disc member 58 and a mating groove may be cut in the top of the second rotary member 42, so that the first rotary member 36 is connected to the second rotary member 42 with its claw inserted in the groove of the second rotary member 42. In this embodiment, according to this invention, the first rotary member 36 and the second rotary member 42 may be an integral structure.

Figure 5:
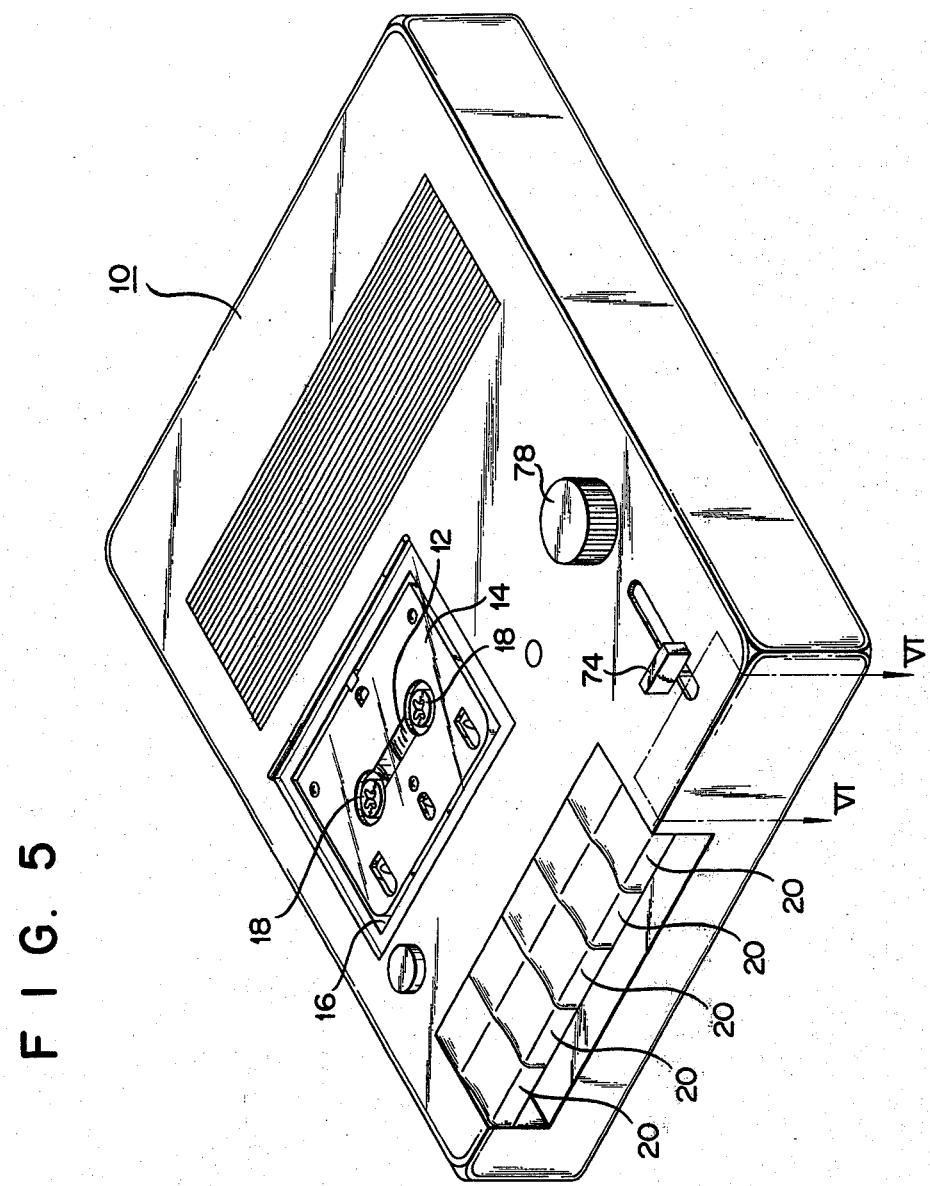
FIG. 5 is a perspective view of a tape recorder according to a fourth embodiment of this invention.
Figure 6:
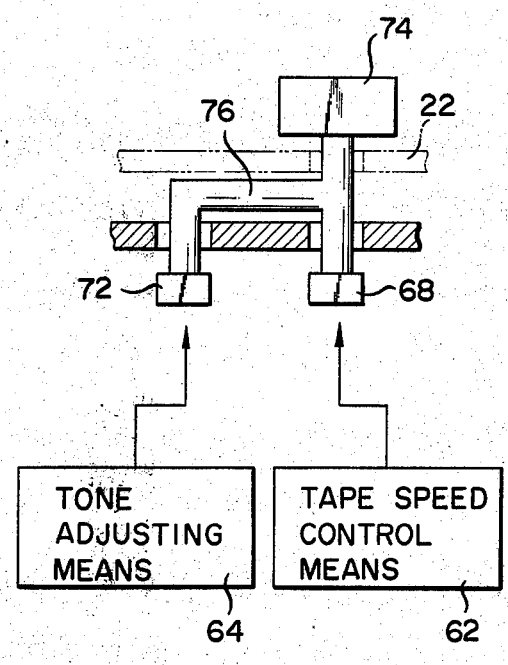
FIG. 6 is a schematic cross sectional view of the fourth embodiment, taken along line VI—VI in FIG. 5.
Figure 7:
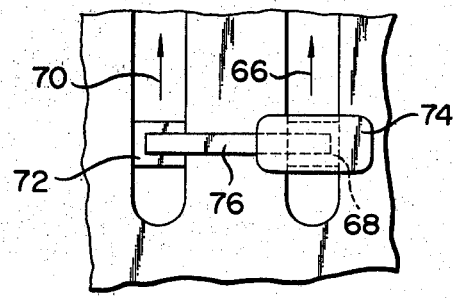
FIG. 7 is a schematic plan view of that portion of the fourth embodiment which is shown in FIG. 6.

Now referring to FIGS. 5 to 7, a fourth embodiment of this invention will be described. In FIGS. 5, 6 and 7, the same numerals are used to denote like or the same members as illustrated in FIG. 2.

A tape recorder 10 shown in FIG. 5 has in its housing 22 such tape speed control means 62 and tone adjusting means 64 which have the same function as do those of the first embodiment. The tape speed control means 62 is of slide type which has a slide member 68. When the slide member 68 is moved in the direction of arrow 66 as shown in FIG. 7, the tape running speed is increased. When the slide member 68 is moved in the reverse direction, the tape running speed is reduced. The tone adjusting means 64 is also of slide type which has a slide member 72. When the slide member 72 is moved in the direction of arrow 70 as shown in FIG. 7, the high frequency response of sound reproduced from a magnetic tape 12 is lowered. When the slide member 72 is moved in the reverse direction, the high frequency response is elevated.

The slide member 68 extends upward and protrudes outside the housing 22 through an opening made in the top wall of the housing 22. To the upper end portion of the slide member 68 a knob 74 is secured as shown in FIGS. 5 to 7. As shown in FIG. 6, the slide member 72 extends upward, the upper portion of which is located under the lower surface of the top wall of the housing 22. It is arranged close to the slide member 68, and its upper end is connected to the slide member 68 by means of a connection member 76 which extends straight and horizontally and which is made of a rigid material. The slide members 68, 72 and the connecting member 76 constitute a control mechanism for changing the tape running speed and adjusting the high frequency response of sound reproduced, at the same time.

When the slide member 68 is moved in the direction of arrow 66, thus causing the tape speed control means 62 to increase the tape running speed, the slide member 72 is moved in the direction of arrow 70, thereby lowering the high frequency response of sound reproduced. On the other hand, when the slide member 68 is moved in the reverse direction, thus causing the tape speed control means 62 to reduce the tape running speed, the slide member 72 is moved to cause the tone adjusting means 64 to elevate the high frequency response of sound reproduced.

Each of the first to fourth embodiments is further provided with another adjusting shaft (not shown) which functions independently of the tone adjusting means 26 or 64 and the adjusting shaft 34 or the slide member 72. This another adjusting shaft extends upward and protrudes outside the housing 22 through an opening made in the top wall of the housing 22. To its upper end portion there is secured a knob 78 coaxially which is shown in FIGS. 1 and 5. The other adjusting shaft is connected to the tone adjusting means 26 or 64 alone. Thus, when the knob 78 is turned, the tone adjusting means 26 or 64 can be operated without operating the tape speed control means 24 or 62.

Moreover, the first embodiment shown in FIG. 2 may further comprise a clutch device which is moved between a first position and a second position. When it is set at the first position, the clutch device brings the drive member 48 into engagement with the spur gears 40 and 44. When set at the second position, the clutch device moves the drive member 48 out of engagement with the spur gears 40 and 44. Thus, so long as the drive member 48 stays out of engagement with the gears 40 and 44, the tone adjusting means 26 can be operated without operating the tape speed control means 24.

What is claimed is:
1. In a tape recorder having a knob operated tape speed control means for changing the running speed of a magnetic tape during a recording and/or reproducing operation by the movement of said knob,
the improvement comprising the combination of:
a tone adjusting means having control means for changing the high frequency response of sound reproduced from the magnetic tape during a reproducing operation by the movement of said control means of said tone adjusting means; and
a control mechanism mechanically coupled to said knob of said tape speed control means and to said control means of said tone adjusting means, said control mechanism being responsive to operation of said knob of said tape speed control means for simultaneously operating said control means of said tone adjusting means for causing said tone adjusting means to (i) lower the high frequency response during a reproducing operation when said knob of said tape speed control means is operated to increase the running speed of the magnetic tape, and to (ii) elevate the high frequency response during a reproducing operation when said knob of said tape speed control means is operated to decrease the running speed of the magnetic tape.

2. In the tape recorder of claim 1, the further improvement wherein:
said tape speed control means is of the rotary type in which said knob comprises a rotary shaft for increasing the running speed of the tape when it is rotated in one direction and for decreasing the running speed of the tape when it is rotated in the other direction;

said tone adjusting means is of rotary type in which said control means thereof comprises a rotary shaft for lowering the high frequency response when it is rotated in one direction and for elevating the high frequency response when it is rotated in the other direction; and said control mechanism comprises a first rotary member which is coaxial with said rotary shaft of said tape speed control means so as to rotate together with said rotary shaft of said tape speed control means; a second rotary member which is coaxial with said rotary shaft of said tone adjusting means so as to rotate together with said rotary shaft of said tone adjusting means; and a drive member mechanically coupling said first and second rotary members together for simultaneously rotating said second rotary member in said one direction when said first rotary member is rotated in said one direction, and in said other direction when said first rotary member is rotated in said other direction.

3. In the tape recorder of claim 2, the further improvement comprising:
a first gear which is coaxial with said first rotary member so as to rotate together with said first rotary member; and
a second gear which is coaxial with said second rotary member so as to rotate together with said second rotary member;
said drive member including a drive gear which is in engagement with said first and second gears.

4. In the tape recorder of claim 2, the further improvement comprising:
a pulley which is coaxial with said first rotary member so as to rotate together with said first rotary member; and
a pulley which is coaxial with said second rotary member so as to rotate together with said second rotary member;
said drive member including a driving belt coupling said first and second pulleys together.

5. In the tape recorder of claim 2, the further improvement wherein said rotary shaft of said tape speed control means and said rotary shaft of said tone adjusting means are arranged coaxial with each other.

6. In the tape recorder of claim 5, the further improvement wherein said first and second rotary members are coaxially aligned with said rotary shaft of said tape speed control means and said rotary shaft of said tone adjusting means; and said drive member comprises an adhesive firmly connecting said first and second rotary members together.

7. In the tape recorder of claim 1, the further improvement wherein:
said tape speed control means is of the slide type in which said knob comprises a slide lever for increasing the running speed of the tape when the slide lever is moved in one direction and for decreasing the running speed of the tape when the slide lever is moved in the other direction;
said tone adjusting means is of the slide type in which said control means thereof comprises a slide lever for lowering the high frequency response when it is moved in one direction and for elevating the high frequency response when it is moved in the other direction; and
said control mechanism comprises a connection member rigidly connecting said slide members together such that operation of said slide lever of said tape speed control means simultaneously operates said slide lever of said tone adjusting means in the same respective direction.

8. The tape recorder of any one of claims 1–7, wherein said tape recorder includes at least one magnetic head, said at least one magnetic head being mounted so as to be substantially stationary during recording and reproducing operations.

* * * * *

UNITED STATES PATENT AND TRADEMARK OFFICE
CERTIFICATE OF CORRECTION

PATENT NO. : 4,325,094
DATED : April 13, 1982
INVENTOR(S) : Hiroki ICHIKAWA

It is certified that error appears in the above—identified patent and that said Letters Patent is hereby corrected as shown below:

On the title page, [30] Foreign Application Priority Data should read: -- Feb. 26, 1979    Japan    54-21537 --.

*Signed and Sealed this*

*Seventeenth* Day of *August 1982*

[SEAL]

*Attest:*

*Attesting Officer*

GERALD J. MOSSINGHOFF
*Commissioner of Patents and Trademarks*